United States Patent Office 3,641,059
Patented Feb. 8, 1972

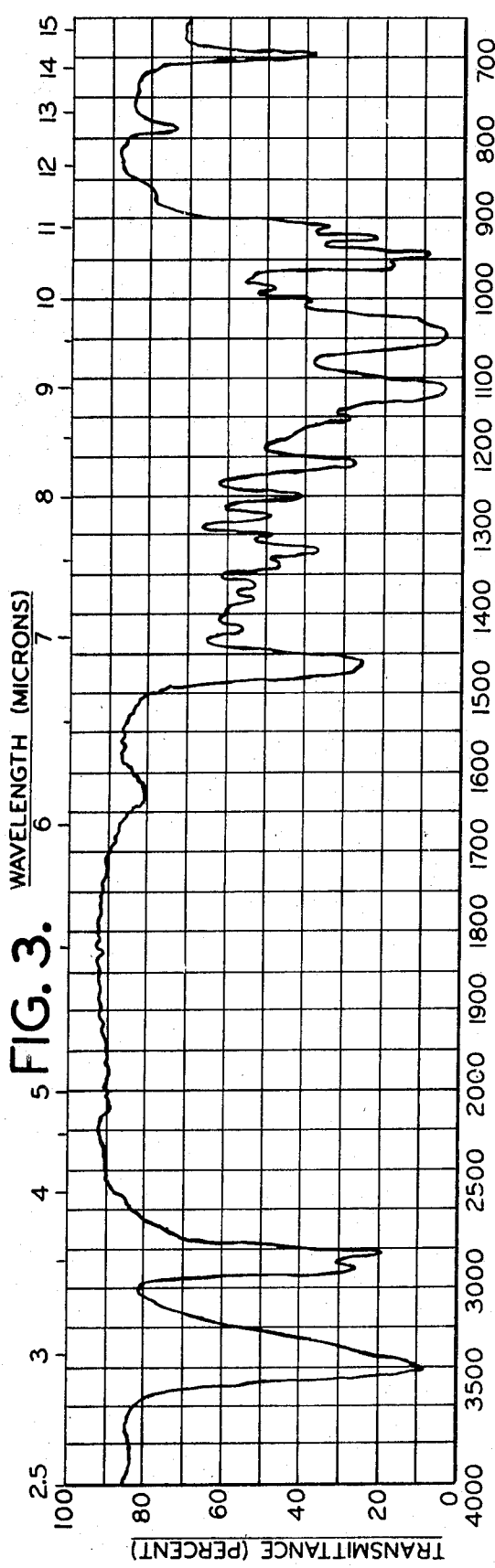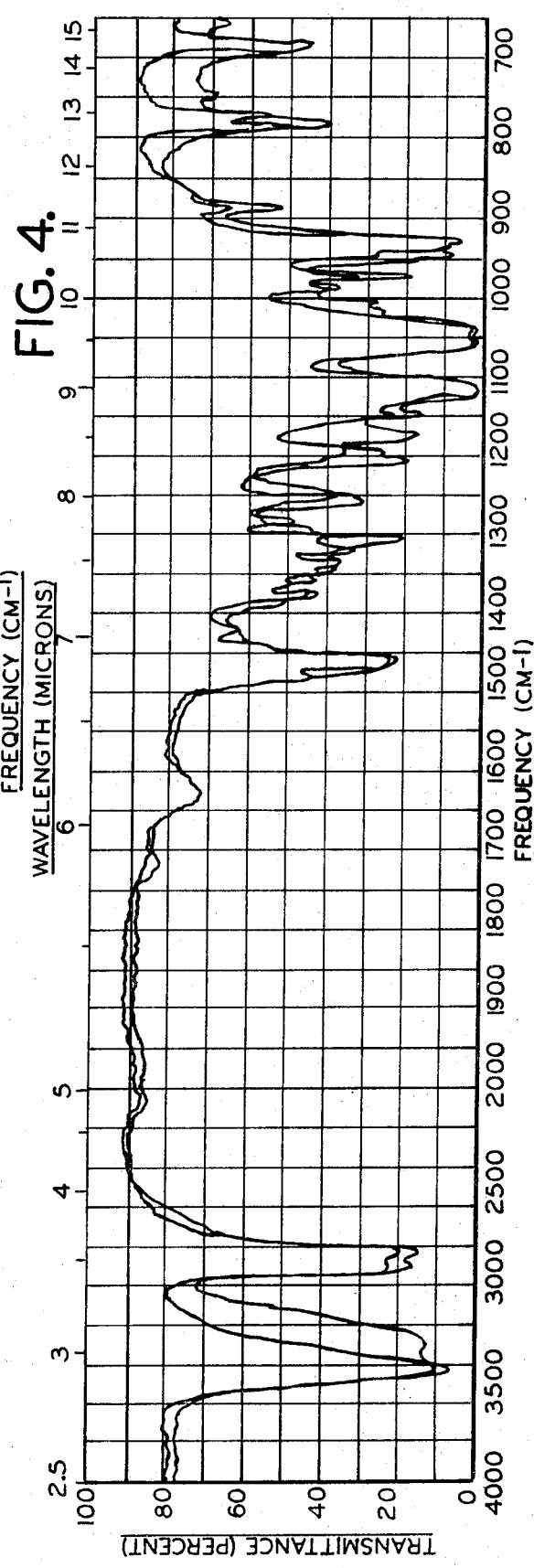

3,641,059
CYCLIC HYDROXYACETALS
Georg Blumenfeld, Sieglar, Germany, assignor to Dynamit Nobel Aktiengesellschaft, Troisdorf, Bezirk Cologne, Germany
Continuation of application Ser. No. 461,557, June 4, 1965. This application Jan. 10, 1969, Ser. No. 802,711
Claims priority, application Germany, June 10, 1964, D 44,647; Jan. 23, 1965, D 46,341
Int. Cl. C07d 15/04, 15/10
U.S. Cl. 260—340.6                                   6 Claims

ABSTRACT OF THE DISCLOSURE

Bis-(hydroxymethylalkyl)dioxanyls are produced by reaction of glyoxalacetals and a trimethanol compound. The dioxanyls can be used in the production of polyesters.

---

This application is a continuation of application Ser. No. 461,557, filed June 4, 1965, now abandoned.

Bis-(hydroxymethylalkyl dioxanyls) of the general formula

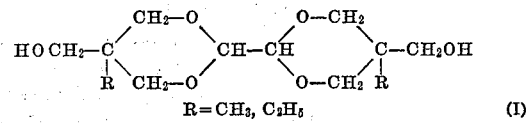

$$R = CH_3, C_2H_5 \qquad (I)$$

and bis-(hydroxymethylalkyl)-bicyclo[5,5,0] - 2,6,8,12-tetraoxadodecanes of the general formula

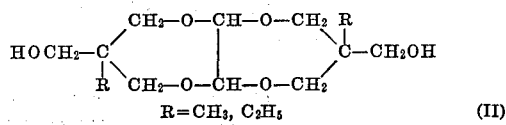

$$R = CH_3, C_2H_5 \qquad (II)$$

have not been known heretofore.

These cyclic hydroxyacetals are, however, of interest because new, interesting properties can be obtained from their polyaddition and polycondensation products. Thus polyesters produced from cyclic hydroxyacetals, preferably together with alkylene-glycols, and terepthalic acid or isophthalic acid, thermoplasts having high softening points and impact strengths can be obtained. The polyesters may be produced in a manner analogous to the known process for the production of polyethylene terephthalate from dimethyl terephthalate and ethylene glycol, wherein the cyclic hydroxyacetals may be used per se alone, or in the isomer mixture. The polyesters are soluble in chlorinated hydrocarbons and are suitable as lacquer raw materials. By injection molding or by extrusion molding, the polyesters may be formed into heat resistant molded bodies.

It was not possible to prepare I or II from trimethylolalkanes and an aqueous glyoxal solution in the presence of an acidic catalyst with distillation of water. This can probably be traced to the fact that glyoxal exists in an aqueous solution as 2,3,5,6 - tetrahydroxy - 1,4-dioxane of Formula III (a dimer of the subsequently formed glyoxal monohydrate),

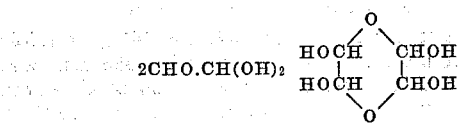

whose condensation with trimethylolalkanes can lead to products with an intact 1,4-dioxane ring.

This conception is based on the fact that tetraalkoxy dioxanes of Formula IV are produced from III and from monovalent alcohols under mild conditions of acetalization.

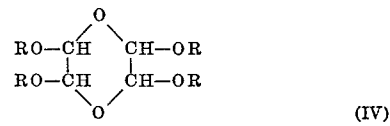

It has been found now that an isomer mixture of Formulas I and II with $R=CH_3$ or $C_2H_5$ can be prepared in the presence of acidic catalysts from trimethylolethane or trimethylolpropane and glyoxalacetals of the general formula

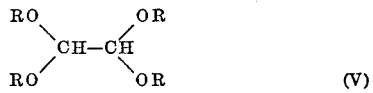

where $R = n\text{-}C_4H_9$ (normal butyl), iso-$C_4H_9$ (iso butyl), $CH_3OCH_2CH_2$ (methoxyethyl), or $C_3H_5OCH_2CH_2$ (ethoxyethyl), in the presence of acidic catalysts.

For example, according to the method of the invention, an isomer mixture of Formulas I and II with $R=CH_3$ is obtained by reaction of trimethylolethane with glyoxal tetrabutyl- or glyoxal tetra-isobutylacetal, or with glyoxal tetramethoxyacetal or- ethoxyethylacetal, while with trimethylolpropane, the isomer mixture with $R=C_2H_5$ is obtained. In order to promote the formation of cyclic hydroxyacetals of Formulas I and II, an excess is usually used, for example 1.5 times the theoretically required amount of trimethylolalkane.

The trimethylolethane is of the $CH_3C(CH_2OH)_3$; the trimethylolpropane is of the formula $$CH_3CH_2C(CH_2OH)_3$$

As an acidic catalyst according to the invention, p-toluenesulfonic acid or the like, or an acidic ion exchanger, as for example a sulfonated copolymer of styrene and divinyl benzene, can be used for example.

The use of an ion exchanger as a catalyst simplifies working up the reaction mixture since neutralization of the acid used as a catalyst, for example p-toluenesulfonic acid, becomes unnecessary, and washing of the products with water is avoided. In this case, it is advantageous according to the present invention to use such a glyoxalacetal in which the trimethylolalkanes used can be dissolved. Thus, for instance, in the preparation of the cyclic hydroxyacetals of Formulas I and II, where $R=CH_3$, the conversion of trimethylolethane in the presence of an acidic ion exchanger is advantageously carried out with glyoxaltetramethoxy ethyl acetals or glyoxaltetraethoxy ethyl acetate, and a little methylene glycol, ethylene glycol or the like are added as solution agents. The conversion is carried out between about 100° C. to about 150° C., where the monomethyl- or monoethyl ether of the glycol is drawn off continuously from the reaction mixture by distillation.

According to the invention, the conversion can also be carried out in a solvent, as for example butyl alcohol or the like. Thus, for example, trimethylolethane or -propane in a butyl alcoholic solution can be reacted with glyoxaltetralkyl acetal in the presence of an acidic catalyst, as for example a cation exchanger, so that butanol is drawn off simultaneously with the alcohol formed from the reaction mixture until the reaction temperature reaches about 140° C. Here, probably, mixed glyoxalacetals of the following common formula are formed as intermediate products in which (glyoxalacetals) the trimethylolalkanes are dissolved:

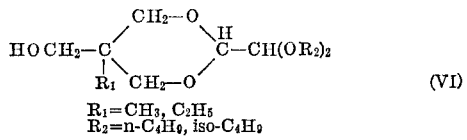

$R_1 = CH_3, C_2H_5$
$R_2 = n-C_4H_9, iso-C_4H_9$

Further heating at decreased pressure brings the reaction to its end.

The separation of the isometric hydroxyacetals from the trimethylolpropane or -ethane still in the reaction mixture can be carried out by boiling the acidic reaction mixture with butanone and benzene and the azeotropic distillation of water according to Example 1.

Here, a cyclic hydroxyketal of the following general Formula VII is formed, with $R=C_2H_5$ formed from trimethylolpropane and butanone, while with $R=CH_3$ formed from trimethylolethane and butanone.

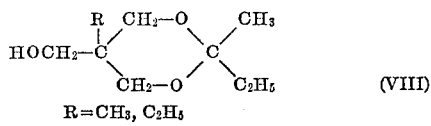

$R = CH_3, C_2H_5$

These hydroxyketals remain in solution, while the hydroxyacetals of Formula II with $R=CH_3$ or $C_2H_5$ crystallize out. After distilling off butanone and benzene and after dissolving the residue in ether, the hydroxyacetal of Formula I with $R=CH_3$ or $C_2H_5$ crystallizes out, while the hydroxyacetal VII with $R=CH_3$ or $C_2H_5$ remains dissolved in ether. After purification of the latter by vacuum distillation, it can easily be hydrolyzed to the parent compounds trimethylolalkane and butanone.

The following manner of purification can, however, also be undertaken: The reaction mixture is acetylated with acetic anhydride, as shall be described in detail in Examples 2, 3, 4, and 5, and the diacetates of Compounds I and II are separated from the triacetoxymethyl alkanes by fractional distillation in a high vacuum. Since the latter have significantly lower boiling points than the diacetates of I and II, this separation may be carried out very well. Regeneration takes place by boiling the diacetates with sodium methylate in absolute methanol and distillation of the methylacetate/methanol azeotrope formed.

The observed indications point to the structures shown for Compounds I and II. The isomer Formula II is to be predicted based on the principle that the isomer with the higher melting point has the most rigid structure (where $R=-C_2H_5$, the M.P. for II is 212° C.). The gross formulae (carbon, hydrogen and oxygen content, relative) are correct. This is assured by elementary analysis, hydroxyl number, formation of diacetate derivatives and their elementary analysis, and also saponification number.

Infra-red spectra confirm the indications as to structure. Infra-red spectra are included herein.

FIG. 3 is the spectrum for $C_{12}H_{22}O_6$, M.P. 240° C., an isomer mixture of Structures I and II, $R=-CH_3$, wherein apparently Structure I predominates; and FIG. 4 is the spectrum for an isomer mixture for $C_{14}H_{16}O_6$ of Structures I and II, $R=-C_2H_5$, wherein the two curves were taken one after the other.

EXAMPLE 1

Figure 2:
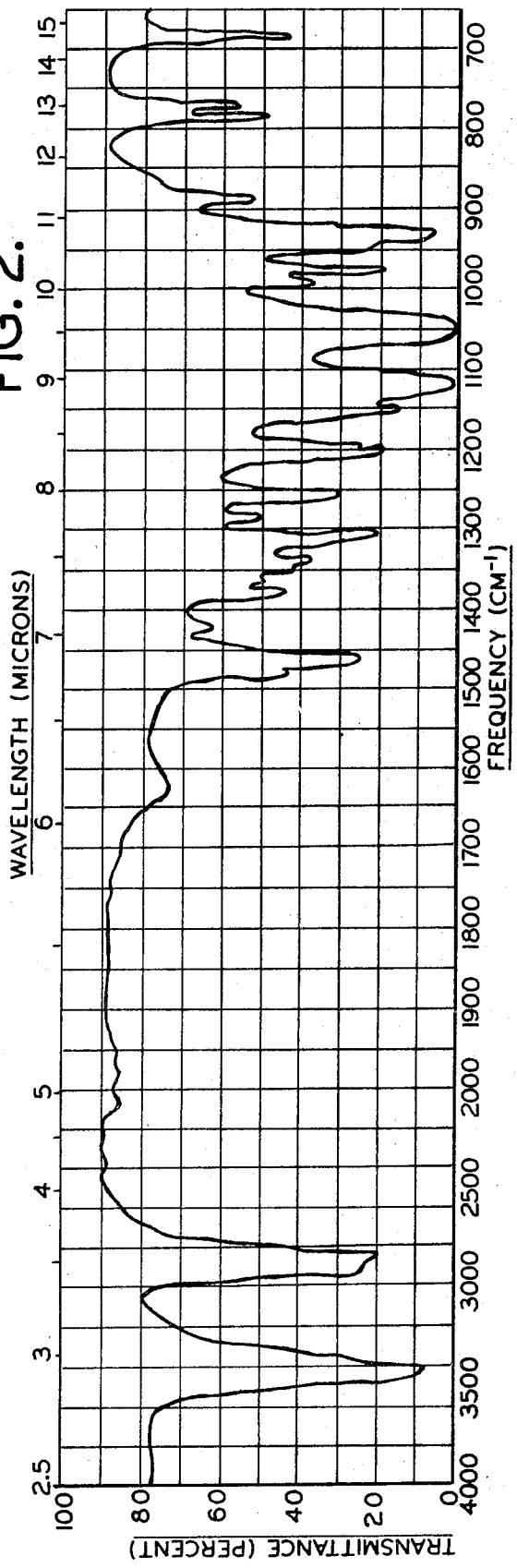
FIG. 2 is the spectrum for $C_{14}H_{26}O_6$, M.P. 212° C., apparently Structure II, $R=-C_2H_5$.

In a vacuum distillation apparatus whose distilling flask is provided with a thermometer, a dropping funnel and a small distilling column, 636 g. of glyoxal-tetrabutylacetal are added dropwise to 804 g. of melted trimethylolpropane and 4 g. of p-toluenesulfonic acid at about 120° C. internal temperature in the vacuum of about 12 torr, and the reaction temperature is kept at about 100° C. by means of the butanol which is being formed in the reaction and is being distilled off. Heating is continued after dropwise addition until no more butanol distills over and the temperature of the reaction mixture has adjusted to the oil bath temperature of 130° C. The reaction mixture is then, while still hot, dissolved in 1 liter of butanone and boiled with 0.5 liter benzene until dehydration is complete, in a column provided with a reflux condenser and a water separator. Hereby, crystals separate, which are suction-filtered after the reaction mixture has cooled off, then washed with benzene and dried in vacuum at 50° C. Yield: 153 g.; M.P. 212° C. Found: C, 58,54%; H, 8.67%; OH number 368. Calcd. C, 58.00%; H, 8.97%; OH number 386. (Calcd. for $C_{14}H_{26}O_6$). Infra-red spectrum, FIG. 2.

Figure 1:
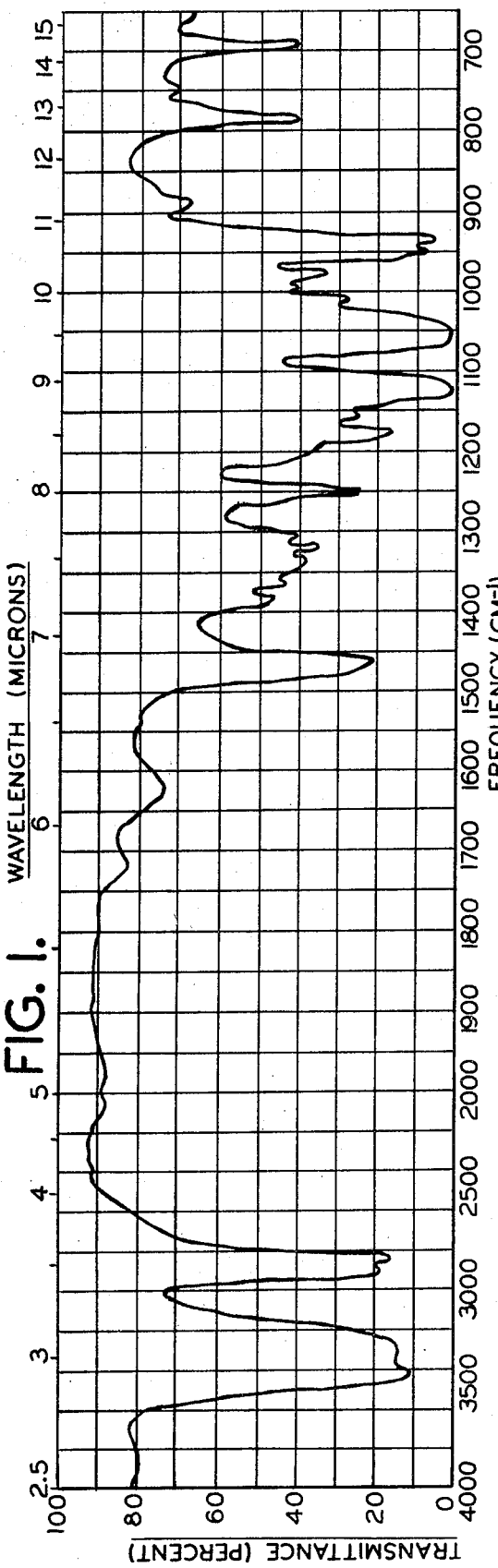
FIG. 1 is the spectrum for $C_{14}H_{26}O_6$, M.P. 150–153° C., apparently Structure I, $R=-C_2H_5$.

Then, butane and benzene are distilled off in vacuum, and the residue is dissolved in 1 liter of ether. The crystals are suction-filtered after standing for awhile, washed with ether and dried in vacuum at 50° C. Yield: 353 g.; M.P. 150–152° C. Found: C, 58.96%; H, 9.14%; OH number 390. Calcd.: C, 58.00%; H, 8.97%; OH number 396. (Calcd. for $C_{14}H_{26}O_6$). Infrad-red spectrum, FIG. 1.

The ethereal mother liquor is shaken with a $K_2CO_3$ solution, dried with $K_2CO_3$, the ether is distilled off and the hydroxyketal VII is distilled in vacuum. Yield: 210 g.

Concerning the structure of both hydroxyacetals obtained of Formula I and II where $R=C_2H_5$, it is assumed that the material which melts at 212° C. and dissolves only slightly in water, corresponds to Structure II, while the mobile Structure I seems to correspond to the isomer which melts at 152° C. and dissolves well in water.

EXAMPLE 2

In a vacuum distillation apparatus as the one described in Example 1, 636 g. of glyoxal tetrabutylacetal are added dropwise to 804 g. of melted trimethylpropane and 4 g. of p-toluenesulfonic acid at a bath temperature of about 140° C. and a vacuum of about 12 torr in such a manner that the temperature of the reaction mixture is kept first between 110° C. and 120° C., whereupon butanol distilled off. The internal temperature was then kept for 2 hours at about 133° C. until butanol no longer came off.

Since the separation and purification of the reaction products of this example were accomplished through the diacetates of the isomer mixture of Formulas I and II with $R=C_2H_5$, the reaction product was dissolved in 500 ml. of glacial acetic acid, 5 g. of potassium carbonate were added and 1 liter of acetic anhydride was added dropwise, while heating under reflux; then the mixture was boiled for another 30 min. Upon gradual cooling off, crystals were formed (designated as crystallizate A), which was suction-filtered, then washed with some glacial acetic acid and then with a lot of water. The preparation which was at first dried in the air and then at 100° C. in vacuum (yield: 284 g.) was then distilled in the vacuum of an oil rotary pump (about 0.5 torr) at 215° C. It melted at 184° C. Found: C, 59.05%; H, 7.79%; VZ 304. Calcd.: C, 57.75%; H, 8.02%; VZ 299. (Calcd. for $C_{18}H_{30}O_8$, diacetates of the isomer mixture of Formulas I and II, where $R=C_2H_5$.)

For regeneration, 168 g. of crystallizate A were heated to boiling with 5 g. of sodium methylate in 1 liter of absolute methanol under a Raschig column, whereupon the azeotripic methyl acetate/methanol mixture was distilled off at about 54° C. After the boiling point of methanol had been reached at the head of the column, another 200 ml. of it were distilled off. A substance crystallized from the methanol which was suction-filtered, washed with a little methanol and dried; it melted at 225° C.

Yield: 101 g. Found: C, 59.52%; H, 9.47%; OH number 385. Calcd.: C, 58.0%, H, 8.97%; OH number 386. (Calcd. for $C_{14}H_{26}O_6$, isomer mixture with an apparently preponderant content of Formula II, where $R=C_2H_5$.)

Acetic acid and acetic anhydride were distilled off in vacuum from the filtrate from crystallizate A until the bath temperature reached 100° C., and the residue was dissolved in 500 ml. of ethyl acetate. Overnight, crystallizate B precipitated which was also washed with a lot of water. The preparation which was dried analogously to crystallizate A (yield: 291 g.) was distilled in the vacuum of an oil rotary pump at 212° C. and melted at 174° C. Found: C, 57.77%; H, 8.06%; VZ 302. Calcd.: C, 57.75%; H, 8.02%; VZ 299. (Calcd. for $C_{18}H_{30}O_8$, diacetates of the isomeric mixture of Formulas I and II, where $R=C_2H_5$.)

For regeneration, 175 g. of crystallizate B were boiled with 5 g. of sodium methylate in 1 liter of absolute methanol with removal of the methyl acetate/methanol azeotrope by distillation. After the solution had been cooled, it was neutralized by shaking with 40 g. of "Ion exchanger I" (product of Merck). This solution was evaporated to a third and treated with 250 ml. of ether. The product which crystallized after prolonged standing was filter-suctioned and dried. Yield: 94 g.; M.P. 194° C. Found: C, 57.49%; H, 8.78%; OH number 367. Calcd.: C, 58.0%; H, 8.97%; OH number 386. (Calcd. for $C_{14}H_{26}O_6$, isomeric mixture with an apparently preponderant content of Formula I, where $R=C_2H_5$.)

EXAMPLE 3

In the apparatus described in Example 1, 326 g. of glyoxaltetramethoxyethyl acetal were added dropwise to 402 g. of trimethylolpropane and 20 g. of "Ion exchanger I" (Merck) at a bath temperature of 140° C. and vacuum of about 12 torr in such a way that the internal temperature remained between 110° C. and 115° C. during the distillation of the methyl glycol. As the temperature was increased gradually to 135° C. after the dropwise addition and was held for one hour, the reaction mixture was dissolved in 500 ml. of glacial acetic acid, filtered off from the ion exchanger, gradually treated with 500 ml. of acetic anhydride while being heated under reflux and thereafter boiled for another 15 min. Then the acetic acid and excess acetic anhydride were distilled off in a water-pump vacuum, and the residue was distilled in the vacuum of an oil rotary pump. At 120°–125° C., 205 g. of triacetoxymethyl propane distilled, and at 208°–215° C., the mixture of the diacetates of I and II ($R=C_2H_5$) passed over. Yield: 279 g., that is 74.6% of the theoretical. Found: C, 56.65%; H, 8.27%; VZ 309. Calcd.: C, 57.7%; H, 8.02%; VZ 299. (Calcd. for $C_{18}H_{30}O_8$.)

EXAMPLE 4

300 g. of trimethylolethane (2.5 mol) were dissolved in 750 ml. of butanol, and 2 g. of p-toluenesulfonic acid were added. After distilling off the butanol, 318 g. of glyoxaltetrabutylacetal were added dropwise to this solution until the temperature of the reaction mixture reached 140° C. Butanol was further distilled in a rough vacuum of about 110 torr at a bath temperature of 150° C., and finally at 12 torr. Thereupon, the residue became crystalline. The crystals were dissolved in 400 ml. of glacial acetic acid with the addition of 2 g. of $K_2CO_3$. While heating under reflux, 400 ml. of glacial acetic anhydride were added dropwise. Heating was continued for another 15 min., whereafter acetic acid and acetic anhydride were distilled off at 110 torr. Finally, the mixture was heated in a vacuum of about 12 torr and the residue was dissolved, while hot, in 500 ml. of ethyl acetate. Crystallization soon set in. After prolonged standing, the crystals were suction-filtered, recrystallized from ethyl acetate and dried in vacuum at 70° C. Yield: 62 g.; M.P. 187° C. Found: C, 56.38%; H, 7.69%; VZ 320. Calcd.: C, 55.50%; H, 7.51%; VZ 323. (Calcd. for $C_{16}H_{26}O_8$, diacetates of the isomer mixture of Formulas I and II, where $R=CH_3$.)

All the filtrates were combined and washed with water. Then the ethyl acetate was distilled off and the residue was distilled in good vacuum (oil rotary pump). After the first runnings which boil at 130° C. and which consist mainly of triacetoxymethylane (91 g.), the main product distilled at 205°–210° C. Yield: 154 g. Found: C, 55.75%; H, 7.62%; VZ 322. Calcd.: C, 55.50%; H, 7.51%; VZ, 323.

EXAMPLE 5

In this case, the same amounts were reacted as in Example 4; the conditions were also identical, with the exception that instead of p-toluenesulfonic acid as the catalyst, 20 g. of "Ion exchanger I" (Merck) were used. After filtration from the ion exchanger, recrystallization and drying, 66 g. of a product with a M.P.=184° C. were obtained. The analysis gave the following values: Found: C, 55.99%; H, 7.58%; VZ 326. Calcd.: C, 55.50%; H, 7.51%; VZ 323. (Calcd. for $C_{16}H_{26}O_8$, diacetates of the isomer mixture of Formulas I and II, where $R=CH_3$.)

All the filtrates were combined and the ethyl acetate was distilled off; the residue was distilled in the vacuum of an oil rotary pump. After about 90 g. of forerunnings distilling at 120°–130° C. (triacetoxymethyl ethane), the main product passed over at 203°–210° C. Yield: 144 g. Found: C, 55.9%; H, 7.58%; VZ 325. Calcd.: C, 55.5%; H, 7.51%; VZ 323. (Calcd. for $C_{16}H_{26}O_8$, diacetates of Formulas I and II, where $R=CH_3$.)

207 g. of the product obtained were heated in a solution of 5 g. of sodium methylate in 1 liter of absolute methanol under a Raschig column which was provided with a reflux control. Altogether, 360 ml. of an azeotropic mixture (methanol/methyl acetate) and methanol were distilled off. While still hot, the solution was neutralized with 40 g. of "Ion exchanger I" (Merck), filtered and cooled off.

After no crystallization occurred, 400 ml. of methanol were distilled off and the solution was cooled in an ice bath. The crystallized diol was suction-filtered and dried at 100° C. in vacuum. Yield. 96 g., M.P. 240° C. Found: C, 55.06%; H, 8.15%. Calcd.: C, 55.0%; H, 8.4%. (Calcd. for $C_{12}H_{22}O$, compound of Formula I or II, where $R=CH_3$). Infra-red spectrum, FIG. 3.

In the foregoing examples, referring to Formula V, R is n-butyl or methoxyethyl. These substituents can be replaced by ethoxyethyl or p-isobutyl.

While the invention has been described with respect to particular embodiments thereof wherein the reaction is carried out in a liquid reaction medium, it is to be understood that these embodiments are merely representative and do not serve to set forth the limits of the invention.

What is claimed is:

1. A compound of the formula

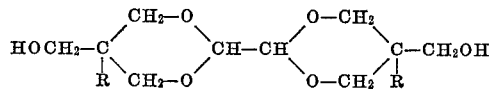

and wherein R is selected from the group consisting of methyl and ethyl.

2. Compound according to claim 1 wherein R is methyl.

3. Compound according to claim 1, wherein R is ethyl.

4. Compound of the formula

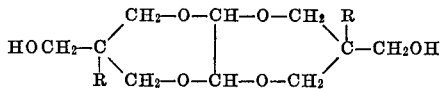

wherein R is of the group methyl and ethyl.

5. Compound according to claim 4, wherein R is methyl.

6. Compound according to claim 4, wherein R is ethyl.

(References on following page)

References Cited

UNITED STATES PATENTS 3,223,713   12/1965   Kesslin et al. ____ 260—340.7 X

OTHER REFERENCES

Lucas, Organic Chemistry, 2nd ed. (1953), p. 213, American Book Co., New York.

Rordestredt, Jr., "Journ. Org. Chem.," vol. 26 (1961), pp. 2247–53.

ALEX MAZEL, Primary Examiner

J. H. TURNIPSEED, Assistant Examiner

U.S. Cl. X.R.

260—340.7

UNITED STATES PATENT OFFICE
CERTIFICATE OF CORRECTION

Patent No. 3,641,059          Dated Feb. 8, 1972

Inventor(s) Georg Blumenfeld

It is certified that error appears in the above-identified patent and that said Letters Patent are hereby corrected as shown below:

Col. 2, line 24 change "$C_3H_5OCH_2CH_2$" to --$C_2H_5OCH_2CH_2$--.

Col. 3, line 70 change "$C_{14}H_{16}O_6$" to --$C_{14}H_{26}O_6$--.

Signed and sealed this 30th day of May 1972.

(SEAL)
Attest:

EDWARD M. FLETCHER, JR.
Attesting Officer

ROBERT GOTTSCHALK
Commissioner of Patents